US010037340B2

(12) United States Patent
Darcy (10) Patent No.: US 10,037,340 B2
(45) Date of Patent: Jul. 31, 2018

(54) TIERED DISTRIBUTED STORAGE POLICIES (71) Applicant: Red Hat, Inc., Raleigh, NC (US)

(72) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 445 days.

(21) Appl. No.: 14/160,435

(22) Filed: Jan. 21, 2014

(65) Prior Publication Data
US 2015/0205818 A1 Jul. 23, 2015

(51) Int. Cl.
G06F 12/00 (2006.01)
G06F 17/30 (2006.01)
(Continued)

(52) U.S. Cl.
CPC .......... *G06F 17/30194* (2013.01); *G06F 3/06* (2013.01); *G06F 17/302* (2013.01); *H04L 67/1097* (2013.01)

(58) Field of Classification Search
CPC .... G06F 3/067; G06F 12/02; G06F 17/30194; G06F 3/0631; G06F 17/30097; G06F 17/30159; G06F 17/302; G06F 2211/1028; G06F 17/30082; G06F 17/30312; G06F 17/30221; G06F 17/30073; G06F 17/30386; G06F 17/30943; G06F 17/30088; G06F 17/30227; G06F 17/30067; G06F 17/30165; G06F 17/30212; G06F 17/03; G06F 17/30; G06F 17/30598; G06F 17/30233; G06F 17/30265; G06F 17/30197; G06F 17/30289; G06F 17/30566; G06F 17/30584; G06F 17/30902; G06F 17/3007; G06F 17/3012; G06F 17/30917; G06F 17/30017; G06F 17/30345; G06F 17/30115
(Continued)

(56) References Cited
U.S. PATENT DOCUMENTS 8,166,257 B1 * 4/2012 Holl, II .................. G06F 13/28
711/114
8,229,897 B2 * 7/2012 Cannon ............... G06F 11/1451
707/644
(Continued)

OTHER PUBLICATIONS

"Tiered Storage," MarkLogic Corporation, printed Jan. 21, 2014, http://www.marklogic.com/what-is-marklogic/deploy-marklogic/tiered-storage/.
(Continued)

*Primary Examiner* — Syling Yen
*Assistant Examiner* — Cecile Vo
(74) *Attorney, Agent, or Firm* — Lowenstein Sandler LLP (57) ABSTRACT A processing device identifies a file (or data block) and selects a storage location for the file based on a plurality of data distribution policies. To select the storage location, the processing device applies, at a top distribution layer, a first data distribution policy to select a first storage pool from a plurality of storage pools based on a first storage criterion. The processing device then applies, at a bottom distribution layer, a second data distribution policy associated with the first storage pool to select a first storage node from a plurality of storage nodes in the first storage pool based on a second storage criterion. The processing device stores at least a portion of the file in the first storage node of the first storage pool.

20 Claims, 7 Drawing Sheets (51) Int. Cl.
  *G06F 3/06* (2006.01)
  *H04L 29/08* (2006.01)
  *G06F 13/14* (2006.01)

(58) Field of Classification Search
  USPC ..... 707/822, 825, 827, E17.044, 999.1, 640,
      707/647, 679, E17.01, 639, 649, 661,
      707/634, 648, 650, 652, 694, E17.005,
      707/E17.032, 999.205, 636, 645, 646,
      707/790, 802, 999.107; 711/117, 129
  See application file for complete search history.

(56) References Cited

U.S. PATENT DOCUMENTS

| | | | |
|---|---|---|---|
| 8,306,926 B2 | 11/2012 | Prahlad et al. | |
| 8,510,331 B1 | 8/2013 | Zoellner et al. | |
| 8,522,252 B2 | 8/2013 | Chatley et al. | |
| 8,560,639 B2 | 10/2013 | Murphy et al. | |
| 9,053,167 B1* | 6/2015 | Swift | G06F 17/30575 |
| 9,262,313 B2* | 2/2016 | Herron | G06F 12/02 |
| 2007/0150492 A1* | 6/2007 | Shitomi | G06F 17/30082 |
| 2012/0266044 A1 | 10/2012 | Hu et al. | |
| 2013/0262385 A1 | 10/2013 | Kumarasamy et al. | |
| 2015/0052518 A1* | 2/2015 | Sarisky | G06F 9/45533 718/1 |

OTHER PUBLICATIONS

Loshin, David, "Understanding the Big Data Stack: Hadoop's Distributed File System," DataInformed , Published Jul. 15, 2013, http://data-informed.com/understanding-the-big-data-stack-hadoops-distributed-file-system/.

Qureshi, Basit, "CS 495 Cloud Computing," College of Computer Science and Information Systems Prince Sultan University, Published Aug. 7, 2013, http://info.psu.edu.sa/psu/cis/big/cs495/notes/CloudComputing_Dr%20Basit_%20Module_m3a.pdf.

* cited by examiner

TIERED DISTRIBUTED STORAGE POLICIES

TECHNICAL FIELD

Embodiments of the invention relate generally to a distributed file system, and more specifically to applying tiered distributed storage policies to a distributed file system.

BACKGROUND

A distributed file system like Gluster® may include several nodes that store different files. Some distributed file systems balance the files across the several nodes. Such balancing may be performed by a random distribution. However, in many instances network administrators would like to have more control over how the files are distributed across the nodes, while still keeping the nodes balanced. The efficiency and reliability of the distributed file system may be significantly affected by the principles and design choices governing the storage architecture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are a method and apparatus for applying a multi-tiered storage policy approach for a distributed file system. Different traditional storage systems may apply different policies for data storage. For example, a first storage system might use a hierarchical storage policy that selects where to store data based on file age. A second storage system might use a load balancing storage policy that selects where to store data randomly to distribute load evenly across multiple nodes of the storage system. However, the flexibility of traditional storage systems in setting up storage policies can be limited. For example, there may be no mechanism in such traditional storage systems for service providers to set a first data distribution policy and for a service customer to select a second data distribution policy that coexists with the first data distribution policy.

A storage distribution tiering with any number of data distribution tiers may be used in embodiments, and any storage policies may be applied at each of the tiers. At each data distribution tier, a storage policy is applied to select a storage pool, a storage sub-pool or one or more storage nodes in which to store data. This provides a highly flexible storage architecture. For example, at a top tier the system may apply a hierarchical storage policy that selects one of multiple different storage pools to store data based on an age and/or activity level of the data. At a bottom tier the system may apply a random distribution policy to randomly store the data on one or more storage nodes that are within the selected storage pool. In another example, at a top tier the system may apply a multi-tenancy policy that selects a storage pool based on a tenant for which the data is stored. At an intermediate tier, the system may apply a storage policy that is specified by the tenant (e.g., a storage policy that selects a sub-pool of storage on which to store the data based on a data type). At a bottom tier, the system may apply the random distribution policy or another data distribution policy. By mixing and matching the data distribution policies at the different layers, a desired behavior can be achieved without making substantive changes to the distributed file system.

The data distribution policies that are applied at each distribution tier may be different instances of the same data distribution module. Accordingly, the mechanisms used to distribute data at each of the distribution tiers may be the same. The difference between data distribution at the various tiers may be expressed based on the distribution policy at that tier. By using instances of the same data distribution module to apply the distribution policies at each of the tiers, the size and complexity of a distributed file system service can be minimized. Additionally, since the same code may be used at each of the distribution tiers, making updates, bug fixes, and so on is simplified. This may minimize the engineering resources that are dedicated to maintaining, updating and/or improving the distributed file system service.

Throughout this text embodiments may be described with reference to local file systems and to files. It should be understood that the embodiments presented herein also work with block devices. For example, the distributed file system may be layered over a managed block device rather than a file system, and may interface with a block device manager such as a logical volume manager (LVM) rather than with the file system. Additionally, embodiments may determine the appropriate placement for data blocks (e.g., pieces of files) rather than files, may migrate data blocks, and so forth. Accordingly, any operations that are described herein as being performed on files may also be applied on data blocks in some embodiments.

Figure 1:
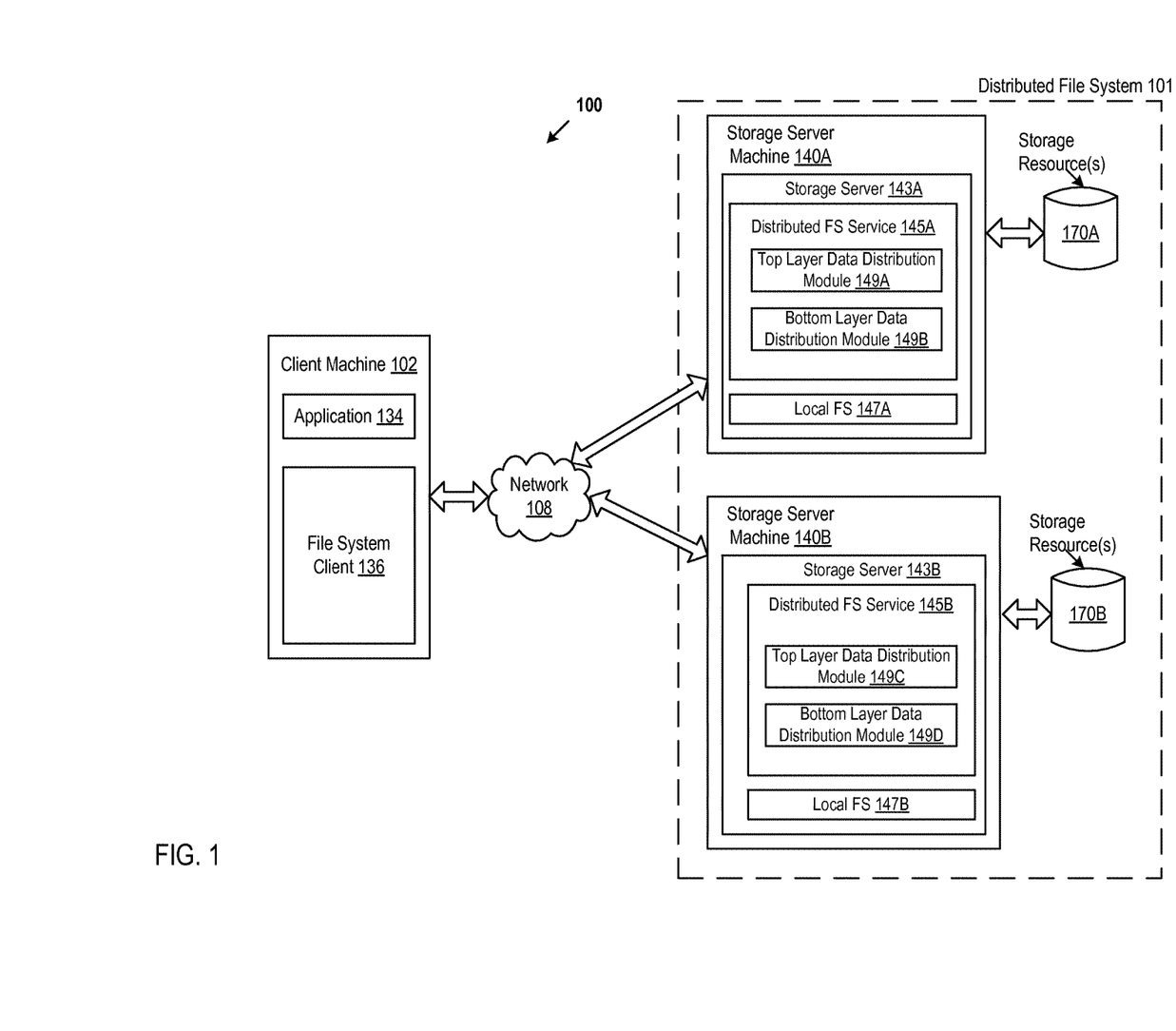
FIG. 1 illustrates an example system architecture having a distributed file system, in accordance with various implementations.

FIG. 1 is an example system architecture 100 for various implementations. The system architecture 100 can include a distributed file system 101 coupled to one or more client machines 102 via a network 108. The network 108 may be a public network (e.g., the Internet), a private network (e.g., a local area network (LAN) or wide area network (WAN), or a combination thereof. Network 108 can include a wireless infrastructure, which may be provided by one or multiple wireless communications systems, such as a Wi-Fi hotspot connected with the network 108 and/or a wireless carrier system that can be implemented using various data processing equipment, communication towers, etc.

The distributed file system 101 can be a network attached storage file system that includes one or more storage server machines 140A-B, each of which may control any number of storage resources 170A-B. A storage server machine 140A-B can include a network-accessible server-based functionality (e.g., storage server 143A-B) or other data processing equipment. The storage server machines 140A-B can include, and are not limited to, any data processing device, such as a desktop computer, a laptop computer, a mainframe computer, a personal digital assistant, a rackmount server, a handheld device or any other device configured to process data. The storage server machines 140A-B of the distributed file system 101 may be grouped into one or more clusters. A cluster is a group of linked storage servers 143A-B working together closely.

The storage resources 170A-B may be mass storage devices, such as magnetic or optical storage based disks, solid-state drives (SSDs) or hard drives, coupled to the storage server machines 140A-B (either directly or via the network 108). The storage resources 170A-B may also include memory such as random access memory (RAM), Flash memory, and so forth. For convenience, some embodiments provided herein may be described with reference to disks or other mass storage devices. However, it should be understood that such embodiments may also apply to memory storage resources. Each storage resource 170A-B may host one or more storage nodes (also referred to as bricks), where each storage node is a logical storage entity.

Storage servers 143A-B may each host a local file system that manages the storage of data on storage resources 170A-B. Each of the storage resources 170A-B may be formatted in accordance with a particular local file system (FS) 147A-B. The local FS 147A-B may create directories, partitions, logical volumes, and so forth on the storage resources 170A-B as well as store data (e.g., files) thereon. Examples of local disk file systems that may be used on disk storage resources include EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-B each additionally include an instance of a distributed file system (FS) service 145A-B. The distributed FS service 145A-B interfaces with local file systems 147A-B to create directories and store files on the storage resources 170A-B. The distributed FS service 145A-B may also create tenant identifiers and associate the tenant identifiers to the directories. The distributed file system service instances additionally interface with one another to form the distributed file system 101.

The distributed file system services 145A-B, and thus the distributed file system 101, can store data as files and can include directories, also referred to as folders, which are virtual containers within the file system 101, in which groups of computer files and possibly other directories can be kept and organized. A sub-directory, also referred to as a sub-folder, is a directory contained inside another directory. The top-most directory is referred to as a root or top-level directory within the file system 101. Together, the directories form a hierarchy, or tree structure of one or more levels in the file system 101.

The distributed file system 101 can organize data (e.g., source files) in the disks 170A-B using volumes. A volume is a grouping of storage that is arranged as a single accessible storage area of the file system 101, which can be resident on a single partition or directory of a hardware resource 170A-B (e.g., of a hard disk) of the file system 101. A volume can be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

A mounted directory, also referred to as a brick or a storage node, can be a basic unit of storage, represented by an export directory on a storage server 143A-B. A brick can be assigned to a volume, a storage sub-volume, a storage pool, a storage sub-pool, a storage resource 170A-B, etc. When a brick is processed, for example, by a data distribution module 149A-D, which can configure the brick, the brick becomes a component of a volume. In one embodiment, a brick can be described using a server identifier with an export directory identifier. One or more bricks (nodes) can be added to a volume to increase the distribution of data amongst volumes and to add to the capacity of the volume. The storage nodes (bricks) may be added and/or removed from storage pools and/or storage sub-pools at any time.

In one embodiment, the distributed file system 101 is a multi-tenant distributed file system, with multiple different tenants that each have access to separate volumes. A tenant may be a container for one or more groups of users. Accordingly, the distributed file system 101 may provide separate volumes to different tenants, where each volume may represent a storage pool and tenants only have access to their volume or volumes. Each disk 170A-B may include multiple different directories or other divisions, and each such directory may be associated with a different tenant. A client machine 102 that mounts the file system 101 may be associated with a particular tenant. Accordingly, the volume (or volumes) of the file system 101 that the client machine 102 mounts are all also associated with that particular tenant. In one embodiment, a directory is generated for a tenant on each of the storage resources that will be used by that tenant. These directories and any files and sub-directories of the directories may be included in the volume or volumes associated with the tenant.

Each instance of the distributed file system service 145A-B may include multiple instances of a data distribution module 149A-D. The instances of a data distribution module 149A-D in a distributed file system instance 145A-145B may be arranged in a hierarchy or multi-tiered architecture. At each tier or layer in the multi-tiered architecture, a data distribution module 149A-D applies a data distribution policy to determine a storage pool, a storage sub-pool or one or more storage nodes on which to store a file.

In the illustrated example, each instance of the distributed file system includes a top layer data distribution module 149A, 149C and a bottom layer data distribution module 149B, 149D. The top layer data distribution module 149A, 149C uses a first data distribution policy to select a storage pool on which a file should be stored. Once a particular pool of storage is selected, the bottom layer data distribution module 149B, 149D selects one or more storage nodes on which to store the file using a data distribution policy that is associated with the bottom layer and/or with the particular selected storage pool. The distributed FS service 145A-B then stores the file on the one or more storage nodes.

As noted, the illustrated example shows a single top layer data distribution module and a second bottom layer data distribution module at each distributed file system service instance 145A-B. However, it should be noted that one or more additional intermediate layer data distribution modules may also be included in the distributed file system services 145A-B for application of data distribution policies at one or more intermediate layers. Additionally, multiple different data distribution modules may be used at a single data distribution layer. For example, each storage pool may be associated with a different bottom layer data distribution module 149B, 149D that applies a data distribution policy that is specific to that storage pool. Implementations of the distributed FS service 145A-B are described in greater detail below in conjunction with FIG. 2.

Any number of client machines 102 can include a file system client 136 to communicate with the storage servers 143A-B in the file system 101. The client machine 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The file system client 136 can mount the file system 101 via a mount point to access the data associated with the file system 101 (or to access data associated with a particular tenant in the file system 101). For example, the file system client 136 may be configured to mount the file system 101 using a volume identifier (e.g., volume label) and a file path that is stored in configuration data. Thus, the client machine may gain access to the volume of a particular tenant that the client machine is associated with, and may therefore gain access to the directories associated with that tenant on the storage resources 170A-B.

The client machines 102 can host one or more applications 134. An application 134 can be any type of application including, for example, a web application, a desktop application, a browser application, etc. An application 134 may request access (e.g., read, write, etc.) to the data in the file system 101 via the mount point and the file system client 136.

Figure 2:
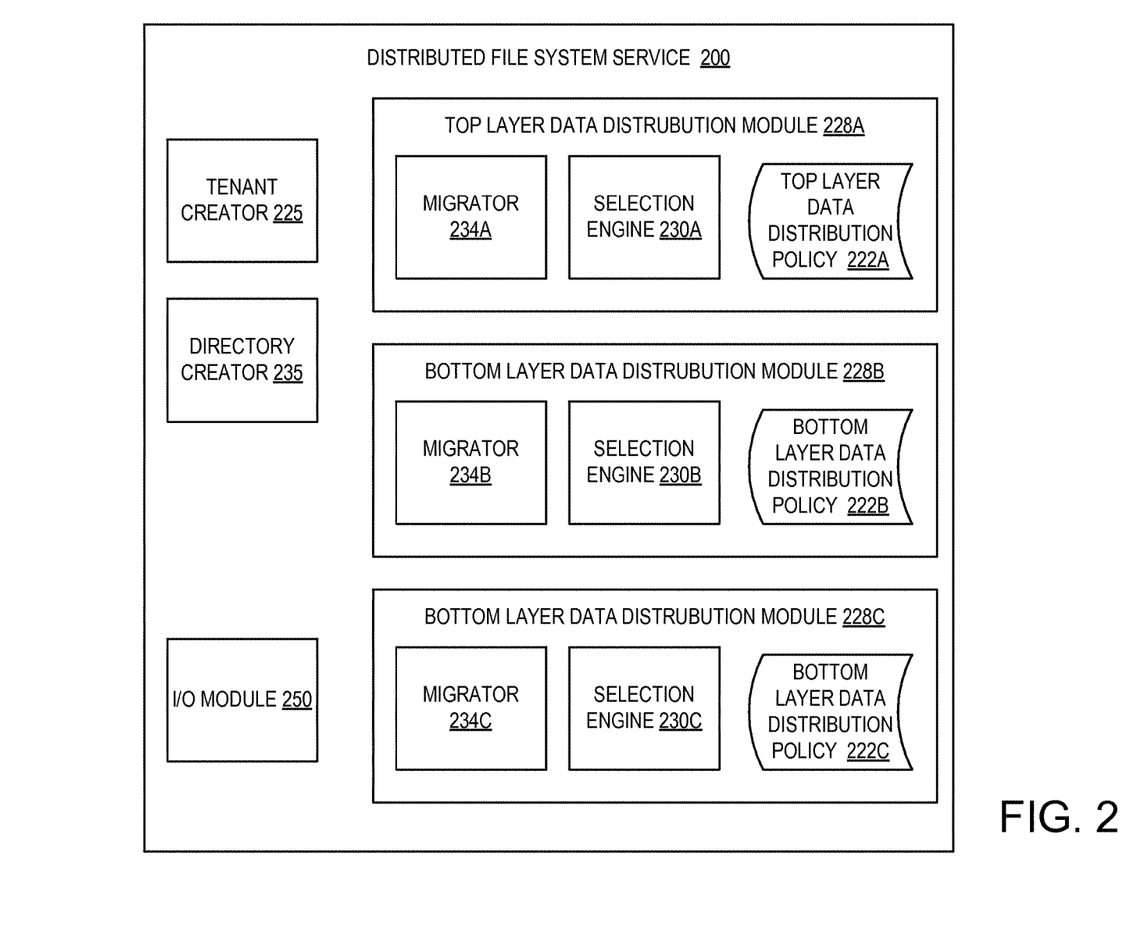
FIG. 2 is a block diagram of an implementation of a distributed file system service.

FIG. 2 illustrates a block diagram of one implementation of a distributed file system service 200. In one embodiment, distributed file system service 200 corresponds to distributed file system service 145A-B of FIG. 1. Distributed file system service 200 may include a tenant creator 225, a directory creator 235, an input/output (I/O) module 250, and one or more instances of data distribution modules 228A-C (e.g., a top layer data distribution module 228A and bottom layer data distribution modules 228B-C). Each data distribution module instance 228A-C may include a selection engine 230A-C and a data distribution policy 222A-C. Alternatively, the functionality of one or more of the tenant creator 225, directory creator 235, I/O module 250, and data distribution modules 228A-B may be combined into a single module or subdivided into multiple modules.

The distributed file system may be distributed across multiple storage servers, each of which may host a local file system that the distributed file system service 200 may interface with. In one embodiment, distributed file system service 200 interfaces with a local file system that is hosted by a storage server that also hosts the distributed file system service. To interface with other local file systems, the distributed file system service 200 may interface with other instances of the distributed file system service 200 that are collocated with those other local file systems.

In one embodiment, tenant creator 225 creates and configures new tenants for a multi-tenant distributed file system. As part of tenant creation, tenant creator 225 may create a unique tenant identifier for a new tenant. Directory creator 235 may then interface with one or more local file systems (e.g., may interface with a collocated local file system, and with remote instances of the distributed file system service 200, which in turn interface with other local file systems) to cause those local file systems to create new directories that may be associated with the unique tenant identifier. Tenant creator 225 may then generate a volume map 220 that maps directories of local file systems to a volume associated with a tenant identifier of the tenant. Alternatively, if multi-tenancy will not be supported, tenant creator 225 may not be included and tenant identifiers may not be used.

Distributed file system service 200 may include two or more data distribution modules 228A-228C. In the illustrated example, distributed file system service 200 includes a single top layer data distribution module 228A and two bottom layer data distribution modules 28B and 228C. However, distributed file system service 200 may also include one or multiple intermediate layer data distribution modules for one or more intermediate layers. Additionally, distributed file system service 200 may include only a single bottom layer data distribution module 228B, or may include more than two bottom layer data distribution modules.

Each data distribution module 228A-C may be an instance of the same code or application. Differences between the data distribution modules 228A-C may be based on the specific data distribution policies 222A-222C that are applied by the different data distribution modules 228A-228C. Each data distribution policy 222A-C may include one or more rules or criteria for selecting which of multiple storage options to select for storing a file. Additionally, each data distribution module 228A-C may be associated with a data distribution tier or layer and/or with a particular body of storage. For example, the top layer data distribution module 228A may be associated with a top data distribution tier. Thus, distributed file system service 200 may invoke the top layer data distribution module 228A when a file (or data block) is to be stored. The top layer data distribution module 228A may then invoke an appropriate intermediate layer data distribution module (not shown) or an appropriate bottom layer data distribution module 228B-C associated with a particular storage option that is selected for the file.

Each data distribution module 228A-C may include a migrator 234A-C, a selection engine 230A-C and a data distribution policy 222A-C. The selection engine 230A-C determines which criteria (if any) of the data distribution policy 222A-C are satisfied by the file (or data block). The selection engine 230A-C then identifies a storage option (e.g., a storage pool, a storage sub-pool, a storage node, etc.) to store the file on based on the satisfied criteria. The selection engine 230A-C may then invoke a next layer data distribution module associated with the selected storage option and/or may attempt to perform an I/O operation, which may cause the next layer data distribution module to be invoked. For example, selection engine 230A of top layer data distribution module 228A may invoke bottom layer data distribution module 228B if a file satisfies a first criterion of the top layer data distribution policy 222A, and may invoke bottom layer data distribution module 228C if the file satisfies a second criterion of the top layer data distribution policy 222A. The selection engines 230B-C of the bottom layer data distribution modules 228B-C determine specific storage nodes or bricks on which the file will be stored based on applying the file (or data block) to the bottom layer data distribution policies 22B-C. Once a node or nodes are selected, the selection engine 230B-C may notify the Input/output module 250 of the distributed file system service 200. The input/output module 250 may then issue file writes to the appropriate storage devices that host the storage node or nodes. Alternatively, the bottom layer data distribution module 228B-C may issue the file writes.

The multi-tiered data distribution policy approach described in embodiments provides a high level of flexibility for setting up storage policies. Any number of data distribution tiers may be set up, and any data distribution polices may be applied at each tier. At each tier, a data distribution module applies a storage policy to narrow down the set of constituent storage nodes that are eligible for storing a particular file (or data block). At the bottom layer, a particular storage node or nodes is then selected for storing the data. At each layer, storage pools, storage sub-pools, etc. may be expanded or shrunk independently.

A first example data distribution policy might group storage nodes into pools or sub-pools based on storage type. For example, a first storage pool may include only storage nodes that are on solid state drives (SSDs), and a second storage pool may include only storage nodes that are on spinning disks (also referred to as disk drives). The first example data distribution policy may be a hierarchical storage management (HSM) policy that determines the age of data and/or the activity of the data (e.g., the most recent access of the data, the frequency of accesses to the data, etc.). The first example data distribution policy may assign new and/or hot files (files with high activity levels) to the first storage pool and may assign old files and/or cold files (files with low activity levels) to the second storage pool.

A second example data distribution policy might group storage nodes based on location. For example, storage nodes that are on storage devices located on the same racks or the same storage servers may be grouped into storage pools or storage sub-pools. Such storage devices may include a single type of storage (e.g., only SSDs or only disk drives) or may include a combination of storage types (e.g., both SSDs and disk drives). The second example data distribution policy may assign files that are to be stored in a particular directory and/or that include particular metadata (e.g., a tag that identifies a particular storage location) to a storage pool associated with a particular location.

A third example data distribution policy may be a multi-tenancy data distribution policy that assigns data to storage pools or storage sub-pools based on a tenant identifier. For example, the distributed file system service 200 may set up a separate volume for each tenant, and each volume may be associated with a different storage pool. The storage nodes and/or storage devices to which the different volumes are mapped may be the same, may overlap, or may be competently different for the different volumes. Alternatively, or additionally, the distributed file system 200 may set up different levels of service, with each storage pool being associated with a particular service level. For example, a first level of service may guarantee a particular read/write speed, a particular level of redundancy, a particular amount of up time (amount of time that the data is available, such as 99.5%), and so on. The multi-tenancy data distribution policy may specify which storage pool to store data for a tenant based on a level of service that the tenant has signed up for.

A fourth example data distribution policy might randomize data placement across storage nodes in a storage pool or a storage sub-pool to balance a load on the storage nodes and/or underlying storage devices. In one embodiment, a random placement data distribution policy causes a selection module 230A-C to generate a hash of data that is to be stored or placed. The data distribution policy may specify hash value ranges for each storage node. The selection engine 230A-C may then determine which storage node is associated with a hash value range that covers the hash value that was computed for the data to be stored. The determined storage node can then be selected.

A fifth example data distribution policy might separate storage pools based on storage services that are provided for storage nodes in those storage pools. Some example storage services include deduplication, erasure coding, replication, snapshotting, bit rot detection, and so on. A first storage pool may include storage nodes that support a snapshotting capability and a second storage pool may include storage nodes that do not support a snapshotting capability. Alternatively or additionally, the first storage pool may include storage nodes that have a first replication policy (e.g., keep 2 copies of all data) and the second storage pool may include storage nodes that have a second replication policy (e.g., keep 1 copy of all data). Alternatively or additionally, the first and second storage pool may differ with regards to any other storage services.

The above recited example data distribution policies are only a small subset of the possible data distribution policies. These and other data distribution policies may be arranged in any order in a multi-tier configuration. The multi-tier configuration may specify a different data distribution policy (which may be administered by a different data distribution module) for each grouping of storage nodes and/or for each tier. For example, a top tier may include a grouping of all storage nodes, and may include a data distribution policy that selects one of multiple different storage pools, each of which includes a different subset of storage nodes from the grouping of all the storage nodes. Each storage pool may be associated with a different data distribution policy that is applied at a bottom tier or at an intermediate tier. If a data distribution policy associated with a storage pool is applied at an intermediate tier, that data distribution policy may be used to select one of multiple different storage sub-pools, each of which includes a different subset of storage nodes from the storage pool. Each of the storage sub-pools may in turn be associated with a different data distribution policy, and so on.

Figure 3:
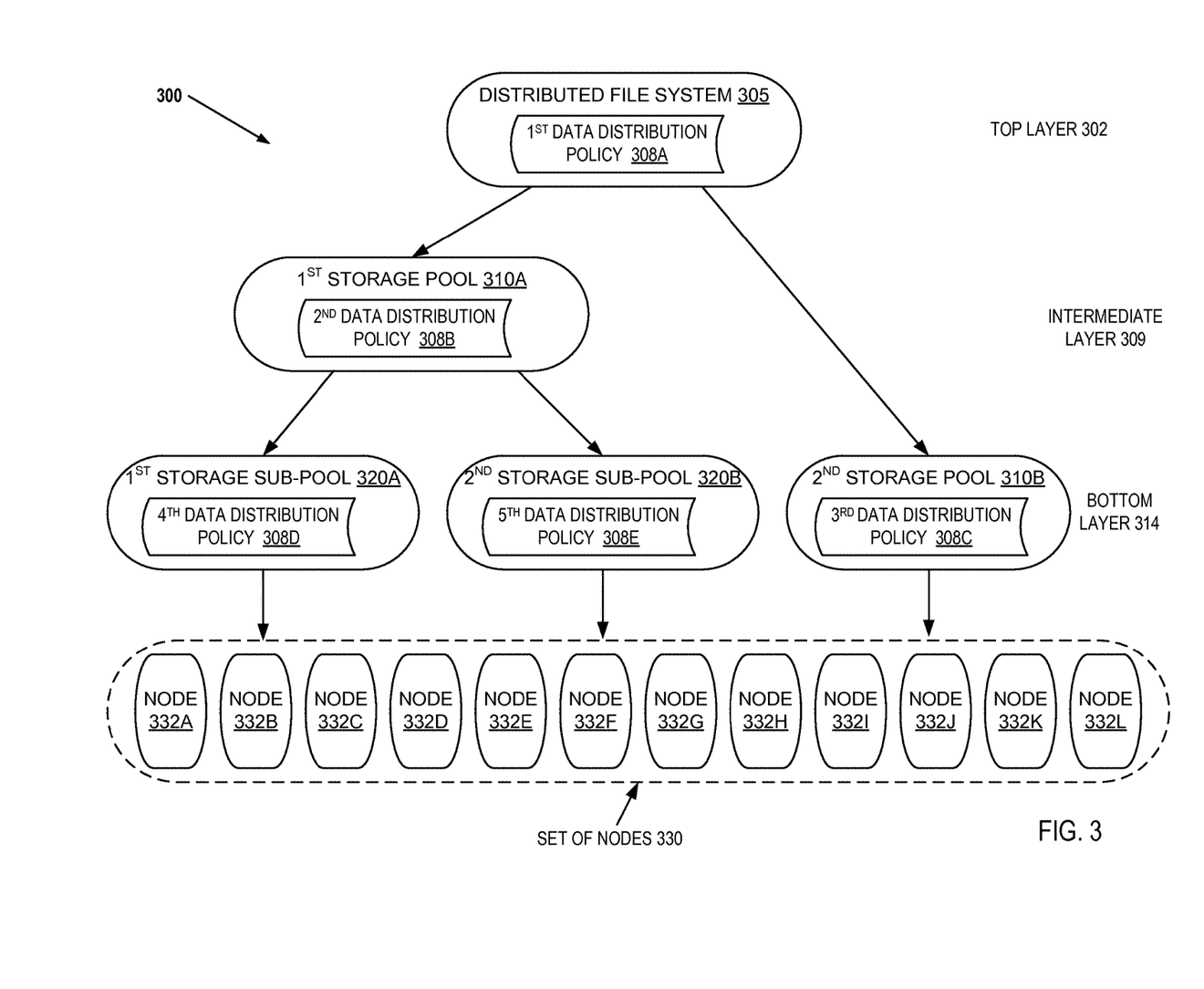
FIG. 3 illustrates an example multi-tiered arrangement of storage policies, in accordance with one embodiment.

FIG. 3 illustrates an example multi-tiered arrangement of storage policies 300, in accordance with one embodiment. Many other multi-tiered storage policy arrangements are also possible.

A top layer 302 for a distributed file system 305 includes a first data distribution policy 308A that divides all of the storage nodes (set of nodes 330) in the distributed file system 305 into a first storage pool 310A and a second storage pool 310B. Note that it is possible for the first storage pool 310A and second storage pool 310B to overlap. For example, the first storage pool 310A and the second storage pool 310B may include some of the same storage nodes. Alternatively, they may include completely different storage nodes.

The first storage pool 310A is associated with a second data distribution policy 308B that divides data into a first storage sub-pool 320A and a second storage sub-pool 320B. Accordingly, the first storage pool 310A and second data distribution policy 308A may be considered to be at an intermediate layer 309.

The second storage pool 310B is associated with a third data distribution policy 308C that does not divide data into storage sub-pools. Accordingly, the second storage pool 310B and third data distribution policy 308C may be considered to be at a bottom layer 314. The first storage sub-pool 320A is associated with a fourth data distribution policy 308D that does not further divide the first storage sub-pool 320A into still smaller storage sub-pools. Additionally, the second storage sub-pool 320B is associated with a fifth data distribution policy 308E that does not further divide the second storage sub-pool 320B into still smaller sub-pools. Accordingly, the first and second storage sub-pools (and fourth and fifth data distribution policies) may be considered to be at the bottom layer 314.

Each of the first storage sub-pool 320A, the second storage sub-pool 320B and the second storage pool 310B include a different subset of the set of nodes 330 that make up the distributed file system 305. Some of the nodes 332A-L in the first storage sub-pool 320A may or may not overlap with nodes 332A-L that are in the second storage sub-pool and/or the second storage pool 310B.

Referring back to FIG. 2, each of the data distribution modules 228A-C may include a migrator 234A-C that migrates (e.g., relocates) files (or data blocks) between groups of storage. For example migrator 234A may migrate files between a first storage pool and a second storage pool. Migrator 234B may migrate files between storage nodes within the first storage pool to balance the storage nodes. Migrator 234C may migrate blocks between storage nodes within the second storage pool to balance the storage nodes.

A migrator 234A-C periodically checks files (or data blocks) that are stored within different groups of storage (e.g., within different storage pools, within different storage sub-pools, within different storage nodes, etc.) to determine whether those files continue to satisfy criteria for storage in their respective storage group. Each migrator 234A-C may scan the files at a same frequency or at different frequencies. The frequency at which to scan the files associated with a particular data distribution module 228A-C may be configured by an administrator.

If a file is identified that no longer satisfies the storage criteria for its current placement, the migrator 234A-C may notify selection engine 230A-C, which can then determine an alternative storage group whose criteria are satisfied by the file. Alternatively, migrator 234A-C may apply the data distribution policy 222A-222C to determine the alternative storage group. Migrator 234A-C may then direct the I/O module 250 to copy the file to the alternative storage group and to delete the original file from its location in the original storage group, or may itself issue I/O commands for performing the operations.

The operations that are performed to migrate a file between storage groups may depend on the layer at which the migration is to occur. For example, if a file is to be migrated at the top layer, then a new storage pool would be selected for the file, and the bottom layer data distribution module 228B-C (or an intermediate data distribution module in some instances) that is associated with that new storage pool would be invoked to determine where to store the file. The bottom layer data distribution module (or intermediate layer data distribution module) would perform the same operations on the file that are performed for a brand new file. In contrast, if migration occurs at the bottom level, then the migrator 234C or selection engine 230C merely determines a new storage node for the file, and then causes the file to be written to the new storage node and deleted from the original storage node. Data migrations that occur at the bottom layer may be transparent (not detectable) to any intermediate layers or the top layer, and may also be transparent to clients. Data migrations that occur at an intermediate layer may be transparent to any parent intermediate layers (if any), to the top layer and to any clients. Data migrations that occur at the top layer may be transparent to clients.

It should be noted that though the total number of steps and the level of transparency associated with migration differs between the layers, the code that performs the migration operations may be the same regardless of the layer. Therefore, the operations that are performed by the data distribution module that initiates the migration at any particular layer may be the same regardless of the layer. For example, at the bottom layer the migrator 234C determines that a file no longer satisfies a criterion for storage in a first storage node and initiates operations to store the file on a second storage node. At an intermediate layer, a migrator determines that a file no longer satisfies a criterion for storage in a first storage sub-pool and initiates operations to store the file on a second storage sub-pool. At a top layer, a migrator 234A determines that a file no longer satisfies a criterion for storage in a first storage pool and initiates operations to store the file on a second storage pool. At any layer, the migrator determines that a migration should occur and then makes calls such as input/output calls that initiate the migration. Also, the same solutions and techniques for ensuring that data migration is transparent to clients may be used by all of the data distribution modules at each of the layers.

Figure 4:
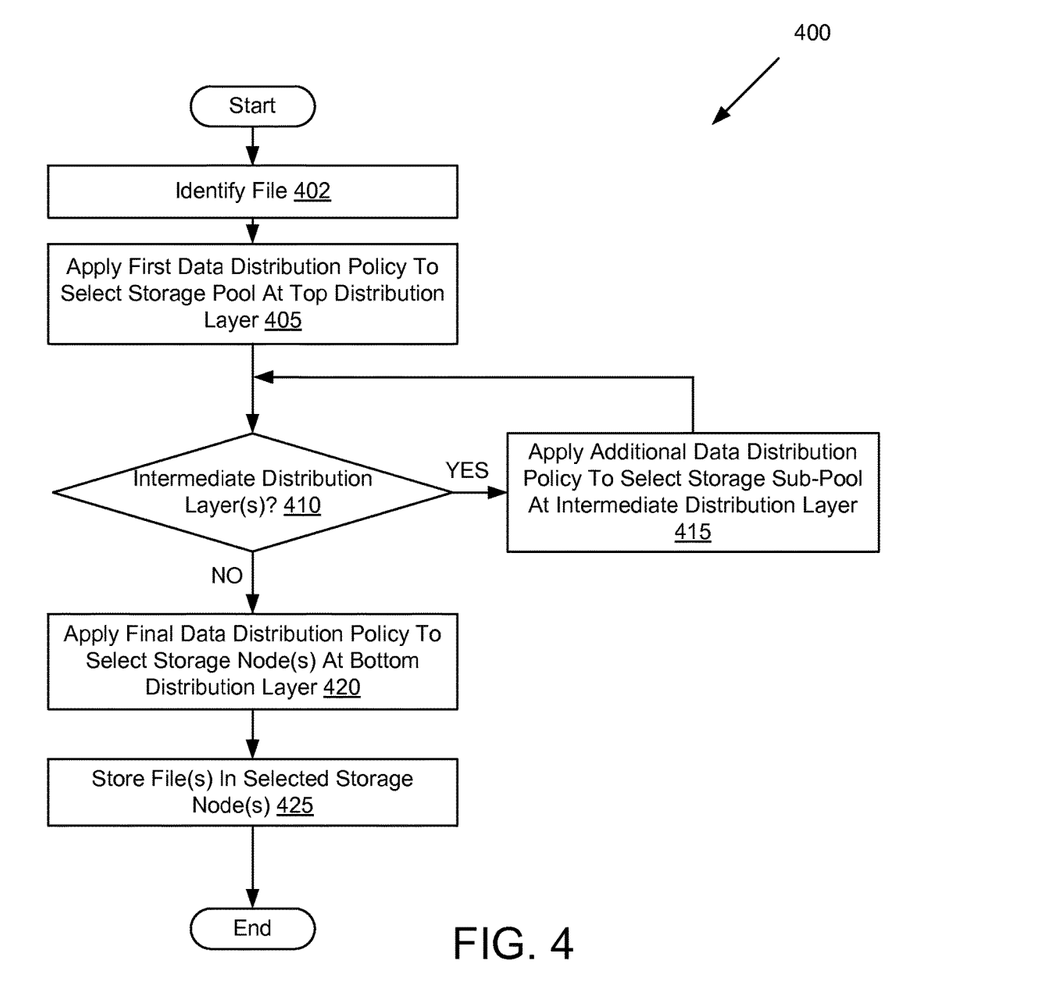
FIG. 4 is a flow diagram illustrating an implementation for a method for applying multiple tiered data distribution policies to store data.
Figure 5:
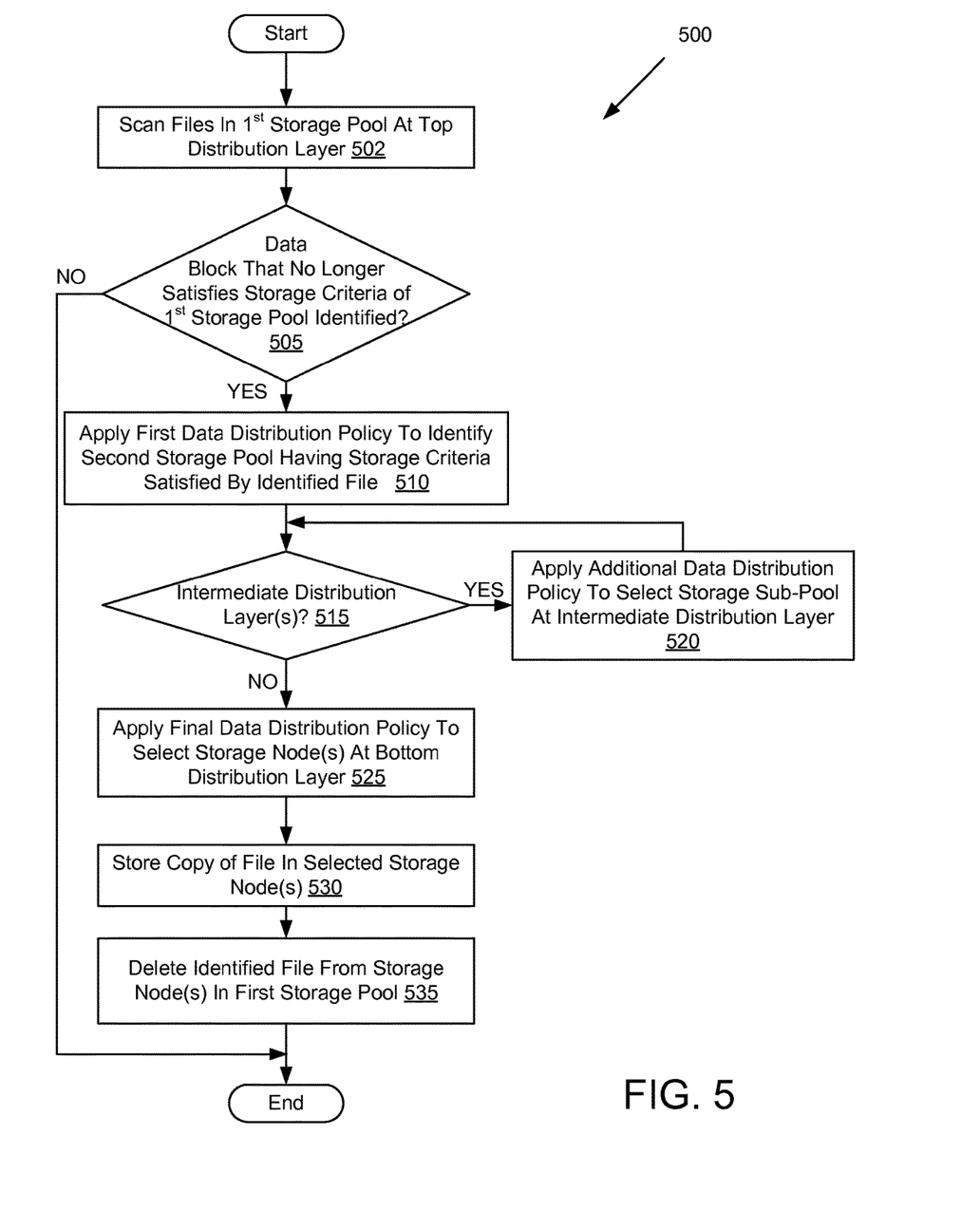
FIG. 5 is a flow diagram illustrating an implementation for a method of migrating data at a top distribution layer.
Figure 6:
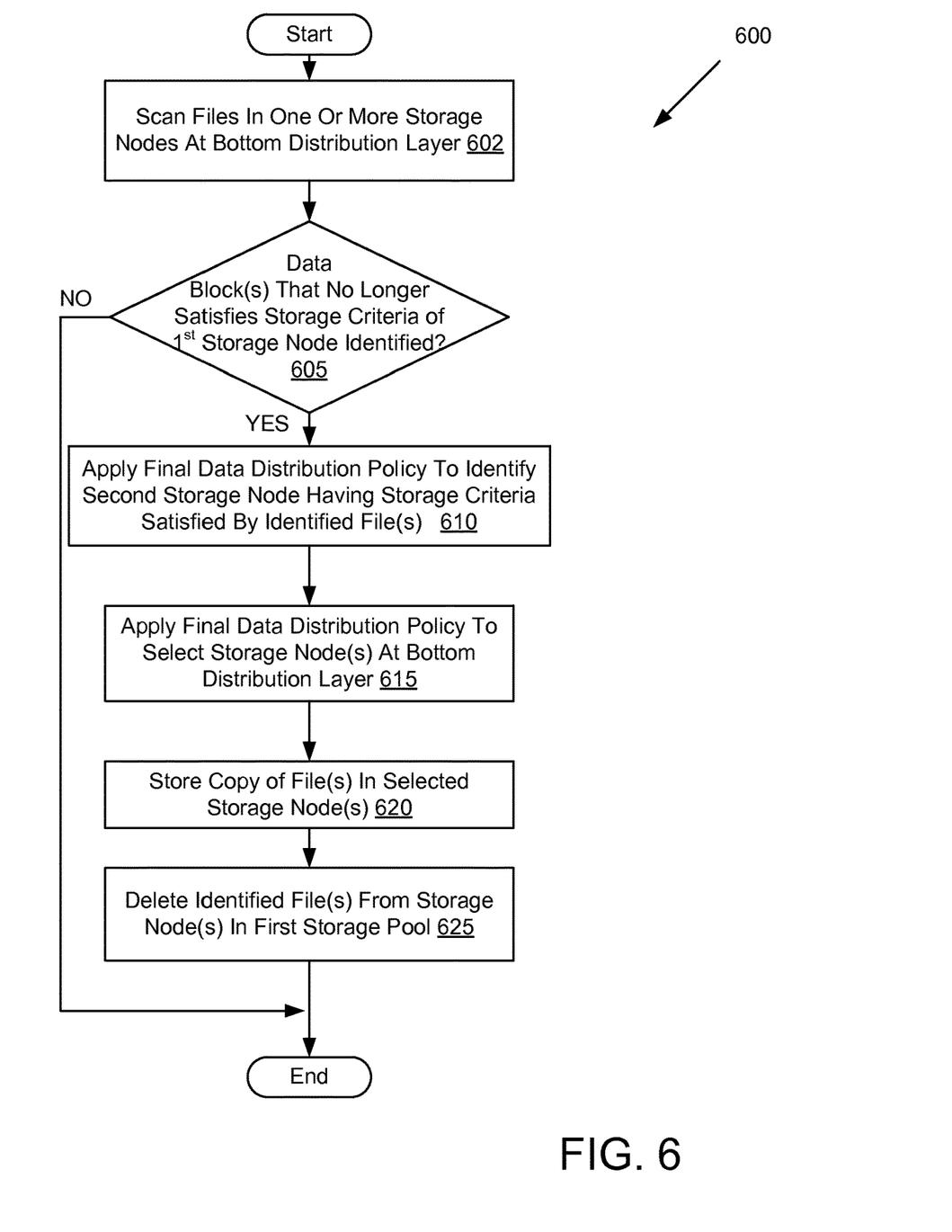
FIG. 6 is a flow diagram illustrating an implementation for a method of migrating data at a bottom distribution layer.

FIGS. 4-6 are flow diagrams showing various methods for storing files (or data blocks) using multiple tiered data distribution policies. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a distributed file system service 200 of FIG. 2 or other distributed file system service.

FIG. 4 is a flow diagram illustrating an implementation for a method 400 for applying multiple tiered data distribution policies to store data. At block 402 of method 400, processing logic identifies a file that is to be stored. At block 405, processing logic applies, at a top distribution layer, a first data distribution policy to select a storage pool in which to store the file. The selected storage pool may be selected from multiple different storage pools. The first data distribution policy may include a different criterion or criteria for each of the storage pools. The selected storage pool may be selected by determining that the file satisfies the criteria associated with the selected storage pool.

At block 410, processing logic determines whether there are any additional intermediate distribution layers associated with the selected storage pool. If there is an intermediate distribution layer associated with the selected storage pool, then at block 415 processing logic applies an additional data distribution policy associated with the selected storage pool to select a sub-pool. The selected storage sub-pool may be selected from multiple different storage sub-pools in the selected storage pool. The additional data distribution policy may include a different criterion or criteria for each of the storage sub-pools. The selected storage sub-pool may be selected by determining that the file satisfies the criteria associated with the selected storage sub-pool. The method then returns to block 410.

If at block 410 processing logic determines that there are no intermediate distribution layers (or no additional intermediate distribution layers), then the method proceeds to block 420. At block 420, processing logic applies, at a bottom distribution layer, a final data distribution policy associated with the selected storage pool and/or the selected storage sub-pool to select one or more storage nodes on which to store the file. The final data distribution policy may include a different criterion or criteria for each of the storage nodes. The selected storage node may be selected by determining that the file satisfies the criteria associated with the selected storage node.

At block 425, processing logic stores the file in the selected storage nodes. This may include performing the appropriate input/output operations (e.g., file writes) on an underlying local file system associated with the selected storage node. The method then ends.

FIG. 5 is a flow diagram illustrating an implementation for a method 500 of migrating data at a top distribution layer. At block 502 of method 500, processing logic scans files in a first storage pool at a top distribution layer. At block 505, processing logic determines whether any of the files in the first storage pool no longer satisfy storage criteria of the first storage pool. These storage criteria may be specified by a data distribution policy of the top distribution layer. If all of the scanned files continue to satisfy the criteria for storage in the first storage pool, the method ends. If a file is identified that no longer satisfies the storage criteria, the method continues to block 510.

At block 510, processing logic applies the first data distribution policy to identify a second storage pool having storage criteria that are satisfied by the identified file. At block 515, processing logic then determines whether there are any intermediate distribution layers that are associated with the second storage pool. If so, the method continues to block 520 and processing logic applies an additional data distribution policy to select a storage sub-pool at the intermediate distribution layer. The method then returns to block 515. If there are no intermediate data distribution layers (or no additional intermediate data distribution layers), then at block 515 the method proceeds to block 525.

At block 525, processing logic applies, at a bottom distribution layer, a final data distribution policy associated with the selected second storage pool and/or a selected storage sub-pool to select one or more storage nodes on which to store the identified file. At block 530, processing logic stores a copy of the identified file in the selected storage node (or nodes). At block 535, processing logic then deletes the file from the storage node (or nodes) in the first storage pool.

The operations of method 500 may be performed for each file that is to be migrated at the top distribution layer. Note that in some embodiments identical operations to those of method 500 may also be performed to migrate data at an intermediate distribution layer.

FIG. 6 is a flow diagram illustrating an implementation for a method 600 of migrating data at a bottom distribution layer. At block 602 of method 600, processing logic scans files in one or more storage nodes at a bottom distribution layer. In one embodiment, processing logic compares the level of used storage and/or the level of available storage in the different storage nodes to determine if there is an imbalance between the storage nodes. At block 605, processing logic determines whether any of the files in a first storage node no longer satisfy storage criteria of the first storage node. These storage criteria may be specified by a data distribution policy of the bottom distribution layer that is associated with a particular storage pool or storage sub-pool. In one embodiment, this includes determining that the first storage node includes more files and/or larger files than other storage nodes within a particular storage pool or storage sub-pool. If the files satisfy the storage criteria of the first storage node (e.g., no re-balancing is called for), the method ends. Otherwise, the method continues to block 610.

At block 610, processing logic applies, at the bottom distribution layer, a final data distribution policy to identify a second storage node having storage criteria that are satisfied by the identified file. In one embodiment, processing logic identifies an under utilized storage node on which to store the file (or files).

At block 620, processing logic stores a copy of the identified file (or files) in the selected storage node. At block 625, processing logic then deletes the file from the first storage node. The method then ends.

Figure 7:
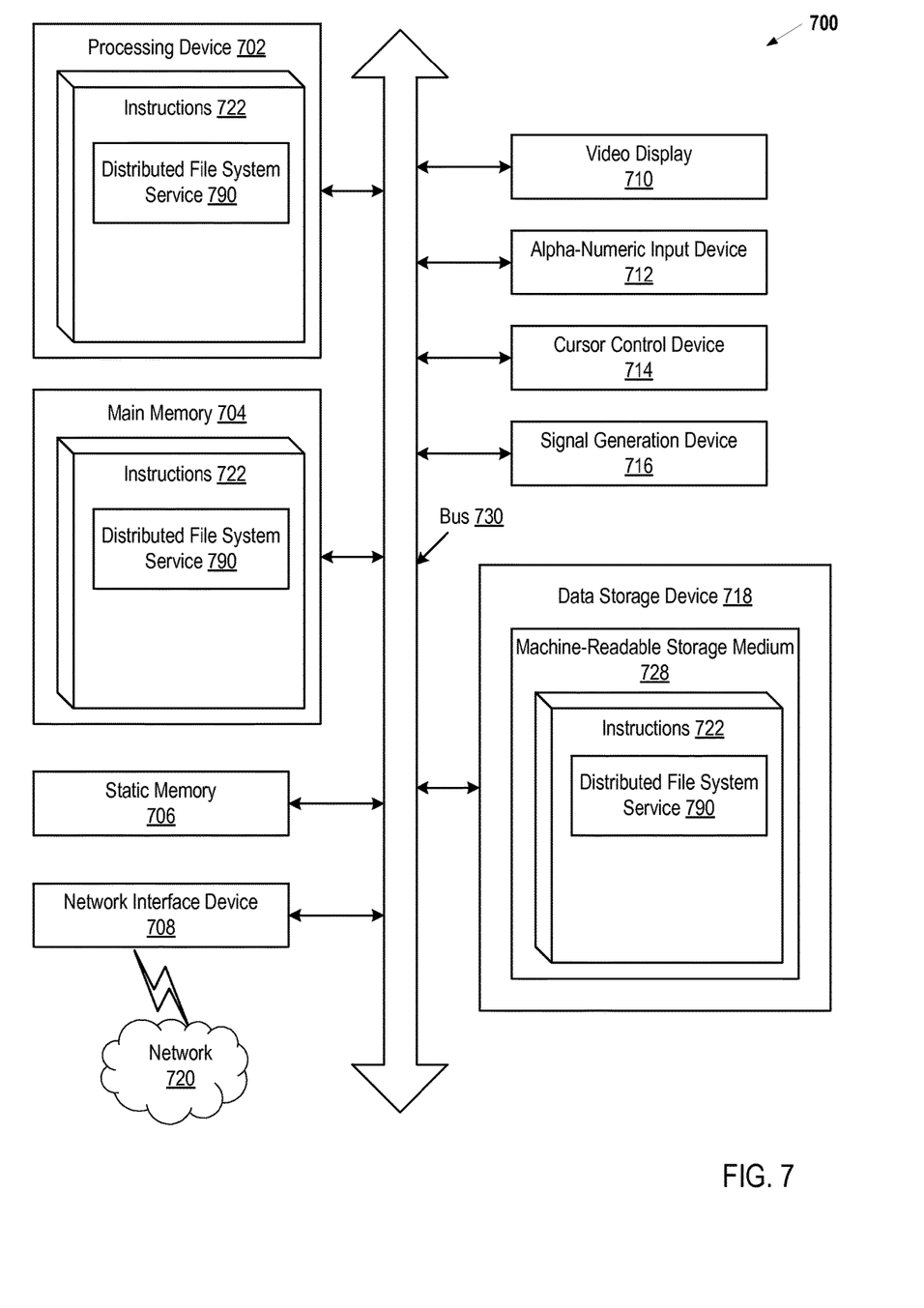
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a distributed file system service (e.g., distributed file system service 200 of FIG. 2) and/or a software library containing methods that call a distributed file system service or modules thereof. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "selecting" or "determining" or "applying" or "migrating" or "storing" or "causing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying a file that is to be stored;
selecting, by a processing device, a storage location from a plurality of storage nodes for the file in view of a plurality of data distribution policies comprising a first data distribution policy comprising a first plurality of storage criteria comprising a first storage criterion, a second data distribution policy comprising a second plurality of storage criteria comprising a second storage criterion that is different from the first storage criterion, and a third data distribution policy comprising a third plurality of storage criteria comprising a third storage criterion that is different from the first storage criterion and the second storage criterion, the second plurality of storage criteria comprising at least one different storage criterion for each of the plurality of storage nodes, the selecting comprising:
applying, at a top distribution layer, the first data distribution policy to determine that the file satisfies the first storage criterion associated with a first storage pool of a plurality of storage pools and the first data distribution policy to narrow the plurality of storage nodes to a subset of the plurality of storage nodes corresponding to the first storage pool, wherein the first data distribution policy is a multi-tenancy policy that is used to select the first storage pool in view of a tenant for which the file is to be stored;
applying, at an intermediate distribution layer subsequent to applying the first data distribution policy, the third data distribution policy to determine that the file satisfies the third storage criterion associated with a first storage sub-pool of the first storage pool and the third data distribution policy to further narrow the plurality of storage nodes to two or more storage nodes corresponding to the first storage sub-pool; and
applying, at a bottom distribution layer, the second data distribution policy associated with the first storage sub-pool to determine that the file satisfies the second storage criterion associated with a first storage node of the two or more storage nodes and the second data distribution policy to select the first storage node subsequent to narrowing the plurality of storage nodes to the two or more storage nodes; and
storing at least a portion of the file in the first storage node of the first storage pool.

2. The method of claim 1, wherein the first data distribution policy divides the plurality of storage nodes into at least the first storage pool and a second storage pool, wherein the first storage pool is associated with the third data distribution policy that divides the first storage pool into at least the first storage sub-pool and a second storage sub-pool, wherein the second storage pool is associated with a fourth data distribution policy that does not divide the second storage pool into storage sub-pools.

3. The method of claim 1, wherein the third storage criterion comprises at least one of:
a hierarchical storage management criterion that is used to select the first storage sub-pool in view of at least one of an age or a usage of the file;
a location criterion that is used to select the first storage sub-pool in view of locations of the two or more storage nodes in the first storage sub-pool;
a storage attribute criterion that is used to select the first storage sub-pool in view of one or more attributes of storage devices associated with the two or more storage nodes in the first storage sub-pool;
a multitenancy criterion that is used to select the first storage sub-pool in view of a tenant identifier of the tenant that originated a request to store the file; or
a storage services criterion that is used to select the first storage sub-pool in view of one or more storage services that are provided for files stored in the first storage sub-pool.

4. The method of claim 1, wherein the first storage criterion comprises:
a multitenancy criterion that is used to select the first storage pool in view of a tenant identifier of the tenant that originated a request to store the file.

5. The method of claim 1, wherein the second storage criterion comprises a random distribution criterion and wherein applying the second data distribution policy to select the first storage node comprises:
generating a hash from the file; and
selecting the first storage node responsive to determining that the hash has a hash value that is within a range of hash values that are assigned to the first storage node.

6. The method of claim 2, further comprising:
periodically determining whether to migrate files between the plurality of storage pools at the top distribution layer, wherein migration of the files between the plurality of storage pools is transparent to a client, said migration comprising:
identifying a second file that no longer satisfies the first storage criterion associated with the first storage pool;
determining that the second file satisfies a fourth storage criterion associated with the second storage pool;
applying, at the bottom distribution layer, the fourth data distribution policy associated with the second storage pool to select a second storage node from a second subset of the plurality of storage nodes in the second storage pool;
storing a copy of the second file on the second storage node of the second storage pool; and
deleting the second file from the first storage node of the first storage pool.

7. The method of claim 1, further comprising:
periodically determining whether to migrate files between the plurality of storage nodes at the bottom distribution layer, wherein migration of the files between the plurality of storage nodes is transparent to a client and to the top distribution layer, said migration comprising:
identifying a second file that no longer satisfies the second storage criterion associated with the first storage node;
determining that the second file satisfies a fourth storage criterion associated with a second storage node in the first storage pool;
storing a copy of the second file on the second storage node of the first storage pool; and
deleting the second file from the first storage node of the first storage pool.

8. The method of claim 1, wherein the processing device is of a storage server executing a distributed file system (FS) service comprising a data distribution module, wherein the applying of the first data distribution policy is by a first instance of the data distribution module associated with the top distribution layer, wherein the applying of the second data distribution policy is by a second instance of the data distribution module associated with the bottom distribution layer, wherein the applying of the third data distribution policy is by a third instance of the data distribution module associated with the intermediate distribution layer.

9. The method of claim 1, wherein identifying the file comprises receiving a request to store the file.

10. A non-transitory computer readable storage medium having instructions that, when executed by a processing device, cause the processing device to:
identify a file that is to be stored;
select, by the processing device, a storage location from a plurality of storage nodes for the file in view of a plurality of data distribution policies comprising a first data distribution policy comprising a first plurality of storage criteria comprising a first storage criterion, a second data distribution policy comprising a second plurality of storage criteria comprising a second storage criterion that is different from the first storage criterion, and a third data distribution policy comprising a third plurality of storage criteria comprising a third storage criterion that is different from the first storage criterion and the second storage criterion, the second plurality of storage criteria comprising at least one different storage criterion for each of the plurality of storage nodes, wherein to select the storage location the processing device is to:
apply, at a top distribution layer, the first data distribution policy to determine that the file satisfies the first storage criterion associated with a first storage pool of a plurality of storage pools and the first data distribution policy to narrow the plurality of storage nodes to a subset of the plurality of storage nodes corresponding to the first storage pool, wherein the first data distribution policy is a multi-tenancy policy that is used to select the first storage pool in view of a tenant for which the file is to be stored;
applying, at an intermediate distribution layer subsequent to applying the first data distribution policy, the third data distribution policy to determine that the file satisfies the third storage criterion associated with a first storage sub-pool of the first storage pool and the third data distribution policy to further narrow the plurality of storage nodes to two or more storage nodes corresponding to the first storage sub-pool; and apply, at a bottom distribution layer, the second data distribution policy associated with the first storage sub-pool to determine that the file satisfies the second storage criterion associated with a first storage node of the two or more storage nodes and the second data distribution policy to select the first storage node subsequent to narrowing the plurality of storage nodes to the two or more storage nodes; and store at least a portion of the file in the first storage node of the first storage pool.

11. The non-transitory computer readable storage medium of claim 10, wherein the first data distribution policy divides the plurality of storage nodes into at least the first storage pool and a second storage pool, wherein the first storage pool is associated with the third data distribution policy that divides the first storage pool into at least the first storage sub-pool and a second storage sub-pool, wherein the second storage pool is associated with a fourth data distribution policy that does not divide the second storage pool into storage sub-pools.

12. The non-transitory computer readable storage medium of claim 10, wherein the third storage criterion comprises at least one of:

a hierarchical storage management criterion that is used to select the first storage sub-pool in view of at least one of an age or a usage of the file;

a location criterion that is used to select the first storage sub-pool in view of locations of the two or more storage nodes in the first storage sub-pool;

a storage attribute criterion that is used to select the first storage sub-pool in view of one or more attributes of storage devices associated with the two or more storage nodes in the first storage sub-pool;

a multitenancy criterion that is used to select the first storage sub-pool in view of a tenant identifier of the tenant that originated a request to store the file; or a storage services criterion that is used to select the first storage sub-pool in view of one or more storage services that are provided for files stored in the first storage sub-pool.

13. The non-transitory computer readable storage medium of claim 10, wherein the first storage criterion comprises:

a multitenancy criterion that is used to select the first storage pool in view of a tenant identifier of the tenant that originated a request to store the file.

14. The non-transitory computer readable storage medium of claim 10, wherein the second storage criterion comprises a random distribution criterion and wherein to apply the second data distribution policy to select the first storage node the processing device is to:

generate a hash from the file; and select the first storage node responsive to determining that the hash has a hash value that is within a range of hash values that are assigned to the first storage node.

15. The non-transitory computer readable storage medium of claim 11, wherein the processing device is further to:

periodically determine whether to migrate files between the plurality of storage pools at the top distribution layer, wherein migration of the files between the plurality of storage pools is transparent to a client, the migration to:

identify a second file that no longer satisfies the first storage criterion associated with the first storage pool;

determine that the second file satisfies a fourth storage criterion associated with the second storage pool;

apply, at the bottom distribution layer, the fourth data distribution policy associated with the second storage pool to select a second storage node from a second subset of the plurality of storage nodes in the second storage pool;

store a copy of the second file on the second storage node of the second storage pool; and delete the second file from the first storage node of the first storage pool.

16. The non-transitory computer readable storage medium of claim 10, wherein the processing device is further to:

periodically determine whether to migrate files between the plurality of storage nodes at the bottom distribution layer, wherein migration of the files between the plurality of storage nodes is transparent to a client and to the top distribution layer, the migration to:

identify a second file that no longer satisfies the second storage criterion associated with the first storage node;

determine that the second file satisfies a fourth storage criterion associated with a second storage node in the first storage pool;

store a copy of the second file on the second storage node of the first storage pool; and delete the second file from the first storage node of the first storage pool.

17. The non-transitory computer readable storage medium of claim 10, wherein the processing device is of a storage server executing a distributed file system (FS) service comprising a data distribution module, wherein the applying of the first data distribution policy is by a first instance of the data distribution module associated with the top distribution layer, wherein the applying of the second data distribution policy is by a second instance of the data distribution module associated with the bottom distribution layer, wherein the applying of the third data distribution policy is by a third instance of the data distribution module associated with the intermediate distribution layer.

18. The non-transitory computer readable storage medium of claim 10, wherein identifying the file comprises receiving a request to store the file.

19. A computing device comprising:

a memory; and a processing device operatively coupled to the memory, the processing device to:

identify a data block that is to be stored;

select a storage location from a plurality of storage nodes for the data block in view of a plurality of data distribution policies comprising a first data distribution policy comprising a first plurality of storage criteria comprising a first storage criterion, a second data distribution policy comprising a second plurality of storage criteria comprising a second storage criterion that is different from the first storage criterion, and a third data distribution policy comprising a third plurality of storage criteria comprising a third storage criterion that is different from the first storage criterion and the second storage criterion, the second plurality of storage criteria comprising at least one different storage criterion for each of the plurality of storage nodes, wherein to select, the processing device is to:

apply, at a top distribution layer, the first data distribution policy to determine that the data block satisfies the first storage criterion associated with a first storage pool of a plurality of storage pools and the first data distribution policy to narrow the plurality of storage nodes to a subset of the plurality of storage nodes corresponding to the first storage pool, wherein the first data distribution policy is a multi-tenancy policy that is used to select the first storage pool in view of a tenant for which the data block is to be stored;

applying, at an intermediate distribution layer subsequent to applying the first data distribution policy, the third data distribution policy to determine that the data block satisfies the third storage criterion associated with a first storage sub-pool of the first storage pool and the third data distribution policy to further narrow the plurality of storage nodes to two or more storage nodes corresponding to the first storage sub-pool; and apply, at a bottom distribution layer, the second data distribution policy associated with the first storage sub-pool to determine that the data block satisfies the second storage criterion associated with a first storage node of the two or more storage nodes and the second data distribution policy to select the first storage node subsequent to narrowing the plurality of storage nodes to the two or more storage nodes; and store at least a portion of the data block in the first storage node of the first storage pool.

20. The computing device of claim 19, wherein the first data distribution policy divides the plurality of storage nodes into at least the first storage pool and a second storage pool, wherein the first storage pool is associated with the third data distribution policy that divides the first storage pool into at least the first storage sub-pool and a second storage sub-pool, wherein the second storage pool is associated with a fourth data distribution policy that does not divide the second storage pool into storage sub-pools.

* * * * *